Figures 2, 3:
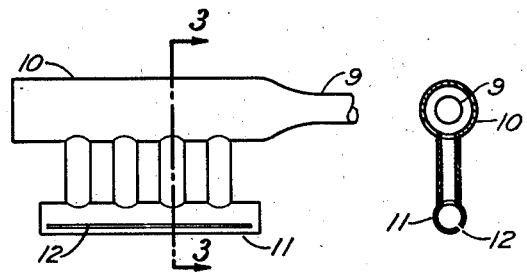

Sept. 3, 1946.  H. F. FISHER ET AL  2,406,820
METHOD FOR REMOVING SUSPENDED MATTER FROM SUSPENSIONS
Filed April 19, 1943

INVENTORS.
HARMON F. FISHER.
ALBERT C. PECK.
BY

Patented Sept. 3, 1946

2,406,820

UNITED STATES PATENT OFFICE 2,406,820

METHOD FOR REMOVING SUSPENDED MATTER FROM SUSPENSIONS

Harmon F. Fisher, Palo Alto, and Albert C. Peck, Los Altos, Calif., assignors, by mesne assignments, to The Permanente Metals Corporation, a corporation of Delaware Application April 19, 1943, Serial No. 483,564

4 Claims. (Cl. 204—184)

This invention relates to the separation of suspensions and more particularly to a method and apparatus for recovering finely divided current-conducting solids, such as metal or carbon particles, from suspensions containing such particles dispersed in non-conducting liquids. With regard to its still more specific features the invention relates to the recovery of finely divided magnesium particles from suspensions thereof in hydrocarbons.

In the course of manufacturing magnesium by the carbothermic reduction of magnesium oxide-containing prime materials the mixture of magnesium vapor and carbon monoxide issuing from the reduction furnace has to be cooled down very suddenly to below, advantageously far below, the solidification point of magnesium, to avoid reversion of the reaction. As a consequence thereof the magnesium is condensed in the form of dust of very fine subdivision. Yet magnesium dust thus produced, owing to the extensive reaction surface presented by the finely divided metal, is highly reactive and even pyrophoric. For preventing dust of such a kind from reacting with the oxygen and nitrogen of the air, the art has resorted to covering the particles with a protective liquid, and the use of liquid hydrocarbons for the purpose has proved rather successful. However, considerable difficulties are encountered in eventually recovering the metal particles from the liquid, seeing that the slurry formed cannot be separated by conventional measures such as settling, centrifuging, filtration. The same problem arises in case hydrocarbons in themselves are used as the chilling medium.

In a prior Patent No. 2,376,535, issued May 22, 1945, filed on December 22, 1941, by Harmon F. Fisher, one of the joint inventors of the present application, it has been proposed to disjoin suspensions of the kind in question by a method which includes in continuous succession the steps of cataphoretically depositing the suspended matter on an electrode, preferably consisting of a rotary drum, by establishing a unidirectional electric field between said electrode and a second ionizing electrode, then withdrawing the deposit from said electric field and subjecting it to the influence of heat-emitting means, and finally removing the deposited matter from the depositing electrode. The present invention aims at improving the method of said prior application, with the view of securing, for a given size of apparatus, the highest separating capacity obtainable.

Accordingly, it is an object of this invention to provide a method and means for enabling two-phase systems of the kind in question to be separated with the attainment of the most favorable degree of concentration of the solid phase.

In general, the method according to the invention comprises the following steps in continuous succession: cataphoretically depositing the suspended matter on a, preferably mobile, depositing electrode, by establishing a unidirectional electric field between said electrode and a second, preferably stationary, ionizing electrode; then withdrawing the deposit formed from said electric field, and subjecting it to the action of means capable of mechanically driving out therefrom part of the included liquid; thereupon introducing the so treated deposit into a heating zone; and finally removing the deposited matter from the depositing electrode.

In the annexed drawing an apparatus capable of performing the said method is represented.

Figure 1:
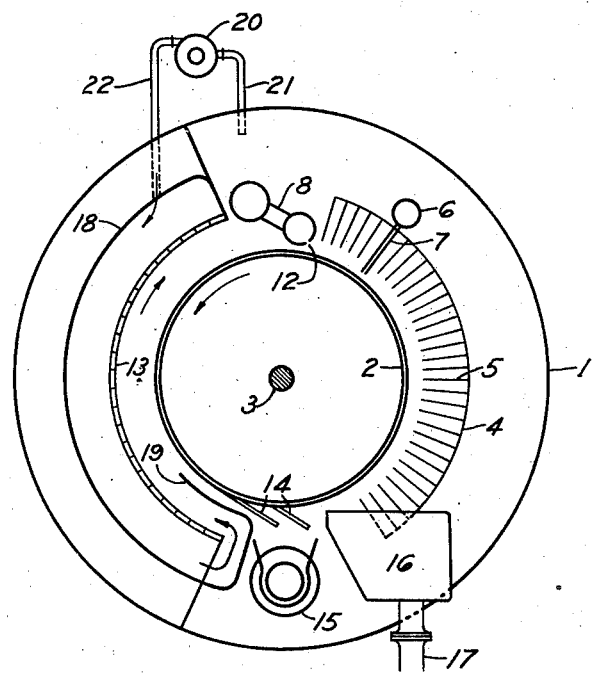

Fig. 1 is a somewhat diagrammatic view in side elevation of the apparatus embodying the invention; Fig. 2 is a detailed top view of a gas blast device forming an essential part of the apparatus; Fig. 3 is a sectional view taken on the line 3—3 of Fig. 2.

In the embodiment of the invention illustrated in the drawing, the apparatus is provided with a, preferably gas-tight, casing 1 held in position by supports (not shown). Said casing contains a drum-shaped electrode 2 constituting a depositing surface, the drum being rigidly mounted on a horizontal shaft 3 and rotated by means of said shaft. Also contained within the casing 1 is a system of ionizing electrodes 4 of semicircular form concentrically surrounding a segment of the cylindrical surface of the drum, which ionizing electrode system is connected with a source of electric potential and disposed adjacent to and spaced from the cylindrical drum surface at a suitable distance, according to the applied voltages, so as to establish a unidirectional electric field of sufficient intensity between the depositing and ionizing electrodes. The ionizing electrode system is electrically insulated from the cylindrical drum surface.

An optional form of ionizing electrode system comprises, in a manner well known per se, units including a plurality of sharp pointed rods 5 uniformly spaced with respect to each other and substantially perpendicularly directed toward the depositing electrode surface. Several groups of semicircular electrode units of this kind, for instance three or five, are uniformly positioned along the entire width of the depositing electrode surface 2, one beside the other at suitable intervals.

To cause the suspension to be treated to flow on, in the form of a film, to the cylindrical surface of the drum electrode 2, there is provided within the upper part of the casing a feed pipe 6 that opens into a nozzle 7 situated adjacent to and appropriately spaced from the surface of the drum and extending the whole width thereof. Advantageously the axis of said nozzle forms an angle of about 45° with the horizontal plane.

Behind the said feed inlet (in the direction of the rotation of the drum), there is positioned a sort of gas blast device 8 that is appropriate for applying a forcible stream of gas to the adjacent drum surface in countercurrent to the direction of rotation. As is shown in Fig. 2, a gas inlet 9 is connected to a manifold 10 with a mouthpiece 11 provided with a slot 12, which extends the whole width of the drum. The gas blast 8 performs the function of skimming off the liquid adhering to the surface of the drum and removing included liquid from the matter deposited thereon. Experiments have shown that the degree of concentration brought about by the gas blast increases in direct relation to the velocity of the gas stream issuing from the mouthpiece; it is therefore advantageous to provide the same with a narrow-slotted orifice. The slot 12 may be so positioned in relation to the surface of the drum that the gas stream is directed to the approaching surface perpendicularly or at any other desired angle.

Behind the blast pipe 8 (in the direction of rotation of the drum) are situated radiant heaters 13 concentrically surrounding a segment of the drum surface the area of which is large enough to allow the deposit to be further concentrated, by drying, while passing underneath.

At a point approximately diametrically opposite to the blast pipe 8 one or more flexible scrapers 14, advantageously wire brushes, are provided so as to contact the width of the cylindrical surface of the rotating drum. Directly thereunder is positioned a funnel system 15 adapted to catch and withdraw the treated solids scraped loose from said surface.

Directly below the rotary drum at the side of the drum at which the suspension to be treated is fed on, there is positioned a trough or launder 16 with an outlet 17 for collecting and withdrawing the cleared liquid phase.

In order to enhance the drying action obtainable by the application of radiant heat, it is advantageous to cause a stream of hot gases to move over the material deposited on the drum. For this purpose an inert gas, such as hydrogen, methane or natural gas, is passed under a suitable hood 18 positioned adjacent to the outside surface of the radiant heater 13 and spaced therefrom to form a duct, the lower end of which turns inward so as to cause the gas to flow upward between the inside surface of the radiant heater 13 and the drum 2 countercurrent to the direction of rotation of the drum. A blower 20 with inlet and outlet pipes 21 and 22 is provided above the casing 1 in such a position as to draw off the gas at a point in the neighborhood of the apex of the casing 1 through pipe 21 and recirculate it through pipe 22 at the top of the duct 18 periodically. On flowing downward through duct 18 the gas is heated and on being moved upward along the inside surface of the radiant heater 13 it continuously supplies additional heat to the matter deposited on the surface of the drum. By such a reuse in cycles of an indifferent gas the drying of the deposited material is markedly improved.

The operation of the apparatus is as follows:

The suspension, for instance, containing as the solid phase finely divided magnesium particles accompanied by a certain amount of magnesium oxide- and carbon particles is uniformly introduced across the surface of the rotating drum electrode 2. The solid particles are separated out of the suspension under the influence of the electric field established between the electrodes, and are deposited on the surface of the rotating drum, whereas the liquid phase flows down to the collecting pan 16, substantially perfectly freed from the solids. During the progressing rotation of the drum the deposit is subjected to a primary treatment that is effected by causing it to pass beneath the forcible gas stream impinging thereon in countercurrent to the direction of rotation. The gas charged must be indifferent to metallic magnesium such as in first instance hydrogen and helium, or other hydrocarbons and natural gases containing hydrocarbons as main components. The concentrating action is then continued during the passage of the drum through the heating zone, whereupon the dried material is removed, by scraping, for further refining treatments.

By the combined action of means capable of skimming off adhering liquid and blowing including liquid from the deposit and of successively applying heat thereto by radiation or convection or both, a higher degree of concentration can be produced than was heretofore attainable in an uninterrupted operation.

The electric potential between the electrodes should preferably be just below the break-down potential for the electrode spacing. The polarity of the electrodes does not have any major effect on the functioning of the separator, although the indications are that with the separation of magnesium the best operation is obtained when the pointed outer electrodes are negative with respect to the drum.

We claim:

1. The method of separating finely divided electrically conducting solids from suspensions thereof in non-conducting liquids which comprises, passing a slurry of said suspension onto a continuously moving electrode, cataphoretically depositing the finely divided solids thereon by the effect of a unidirectional electric field between said electrode and a second ionizing electrode of opposite polarity, withdrawing the electrode from the electric field, blowing included liquid from the deposit by subjecting it to the action of a jet of high pressure gas, and then removing the deposit from the electrode.

2. The method of separating finely divided magnesium from suspensions thereof in non-conducting liquids which comprises passing a slurry of said suspension onto a continuously moving electrode, cataphoretically depositing the finely divided magnesium thereon by the effect of a unidirectional electric field between said electrode and a second ionizing electrode of opposite polarity, withdrawing the electrode from the electric field, blowing included liquid from the deposit by subjecting it to the action of a jet of high pressure gas, and then removing the deposit from the electrode.

3. The method of separating finely divided carbon from suspensions thereof in non-conducting liquids which comprises passing a slurry of said suspension onto a continuously moving electrode, cataphoretically depositing the finely divided carbon thereon by the effect of a unidirectional electric field between said electrode and a second ionizing electrode of opposite polarity, withdrawing the electrode from the electric field, blowing included liquid from the deposit by subjecting it to the action of a jet of high pressure gas, and then removing the deposit from the electrode.

4. The method of separating finely divided electrically conducting solids from suspensions thereof in hydrocarbon liquids which comprises, passing a slurry of said suspension onto a rotating electrode, cataphoretically depositing the finely divided solids thereon by the effect of a unidirectional electric field between said electrode and a second ionizing electrode of opposite polarity, flowing hydrocarbon from the deposit under the influence of gravity, withdrawing the electrode from the electric field, blowing included liquid from the deposit by subjecting it to the action of a jet of high pressure gas, introducing the so treated deposit into a heating zone to further remove included liquid by evaporation, and then removing the deposit from the depositing electrode.

HARMON F. FISHER.
ALBERT C. PECK.